US012781687B2

(12) United States Patent
Lefebvre et al.

(10) Patent No.: US 12,781,687 B2
(45) Date of Patent: Nov. 3, 2026

(54) EXHAUST CASE FOR AIRCRAFT ENGINE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/987,211

(22) Filed: Dec. 19, 2024

(65) Prior Publication Data

US 2026/0177018 A1 Jun. 25, 2026

(51) Int. Cl.

*F01D 25/24* (2006.01)
*F01D 25/30* (2006.01)
*F02K 1/40* (2006.01)
*F02K 1/78* (2006.01)

(52) U.S. Cl.

CPC ................ *F02K 1/40* (2013.01); *F01D 25/30* (2013.01); *F02K 1/78* (2013.01); *F05D 2220/323* (2013.01); *F05D 2250/52* (2013.01)

(58) Field of Classification Search

CPC ..... F02K 1/04; F02K 1/40; F02K 1/54; F02K 1/78; F02K 1/80; F05D 2250/52; F01D 25/24; F01D 25/26; F01D 25/30

See application file for complete search history.

(56) References Cited

U.S. PATENT DOCUMENTS

| | | | |
|---|---|---|---|
| 2,945,350 | A | 7/1960 | Albert |
| 3,752,597 | A | 8/1973 | Heinold |
| 4,331,338 | A | 5/1982 | Caldwell et al. |
| 6,148,604 | A | 11/2000 | Salt et al. |
| 6,287,091 | B1 | 9/2001 | Svihla |
| 6,357,752 | B1 | 3/2002 | Lampes |
| 6,751,962 | B1 | 6/2004 | Kuwabara et al. |
| 6,951,108 | B2 | 10/2005 | Burrus |
| 7,347,425 | B2 | 3/2008 | James |
| 7,857,576 | B2 | 12/2010 | Durocher et al. |

(Continued)

FOREIGN PATENT DOCUMENTS

| | | | |
|---|---|---|---|
| CA | 2915658 | C | 10/2023 |
| CN | 219795347 | U | 10/2023 |

(Continued)

*Primary Examiner* — Gerald L Sung
*Assistant Examiner* — Sean V Meiller
(74) *Attorney, Agent, or Firm* — NORTON ROSE FULBRIGHT CANADA LLP

(57) ABSTRACT

An exhaust system for an aircraft engine, has: a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit; and an exhaust case surrounding the TED, the exhaust case having: a frustoconical section extending from a fore end at an intersection with a remainder of the exhaust case to an aft end securable to a turbine case of the aircraft engine, the frustoconical section converging towards the central axis from the fore end to the aft end; and a connecting flange at the aft end, the connecting flange protruding inwardly towards the central axis.

20 Claims, 7 Drawing Sheets

(56) References Cited

U.S. PATENT DOCUMENTS

| | | | |
|---|---|---|---|
| 8,157,511 B2 | 4/2012 | Pietrobon et al. | |
| 8,322,976 B2 | 12/2012 | Chila et al. | |
| 8,382,429 B2 | 2/2013 | Grussmann et al. | |
| 8,844,863 B2 | 9/2014 | Piesker | |
| 8,985,942 B2 | 3/2015 | Daniels et al. | |
| 9,157,334 B2 | 10/2015 | Grede et al. | |
| 9,188,024 B2 | 11/2015 | Tardif | |
| 9,435,266 B2 | 9/2016 | Sutterfield et al. | |
| 9,587,502 B2 | 3/2017 | Davis et al. | |
| 9,605,551 B2 | 3/2017 | Feldmann et al. | |
| 9,879,780 B2 | 1/2018 | Rogers et al. | |
| 9,880,059 B2 | 1/2018 | Myers et al. | |
| 9,932,844 B2 | 4/2018 | Sutterfield et al. | |
| 9,969,500 B2 | 5/2018 | Anderson et al. | |
| 9,988,919 B2 | 6/2018 | Davis et al. | |
| 10,082,043 B2 | 9/2018 | Lefebvre et al. | |
| 10,082,085 B2 | 9/2018 | Thomas et al. | |
| 10,145,308 B2 | 12/2018 | Roy Thill et al. | |
| 10,280,778 B2 | 5/2019 | Rogers et al. | |
| 10,378,451 B2 | 8/2019 | Dillard | |
| 10,400,617 B2 | 9/2019 | Akiyama et al. | |
| 10,480,336 B2 | 11/2019 | Sutterfield et al. | |
| 10,514,003 B2 | 12/2019 | Akcayoz et al. | |
| 10,550,767 B2 | 2/2020 | Eleftheriou et al. | |
| 10,577,959 B2 | 3/2020 | Bokhorst et al. | |
| 10,731,493 B2 | 8/2020 | Davis et al. | |
| 10,767,565 B2 | 9/2020 | Di Florio et al. | |
| 11,168,828 B2 * | 11/2021 | Macfarlane | F01D 25/243 |
| 11,248,675 B2 | 2/2022 | Rzeszutek et al. | |
| 11,319,897 B2 | 5/2022 | Joo et al. | |
| 11,339,679 B1 | 5/2022 | Lefebvre et al. | |
| 11,428,122 B1 | 8/2022 | Lefebvre et al. | |
| 11,530,622 B2 * | 12/2022 | Lefebvre | F04D 29/522 |
| 11,542,830 B2 | 1/2023 | Yang | |
| 11,905,844 B2 | 2/2024 | Kim et al. | |
| 11,959,390 B2 | 4/2024 | Savard et al. | |
| 11,999,501 B2 | 6/2024 | Joo et al. | |
| 12,110,796 B1 | 10/2024 | Vinski et al. | |
| 12,246,844 B1 | 3/2025 | Weaver et al. | |
| 12,420,941 B2 | 9/2025 | Lefebvre et al. | |
| 2014/0366544 A1 | 12/2014 | Maccaul et al. | |
| 2015/0240662 A1 | 8/2015 | Niggemeier et al. | |
| 2021/0222589 A1 | 7/2021 | Lefebvre et al. | |
| 2022/0120197 A1 | 4/2022 | Lefebvre et al. | |
| 2024/0150030 A1 | 5/2024 | Legras et al. | |
| 2024/0182178 A1 | 6/2024 | Lefebvre et al. | |
| 2024/0254942 A1 | 8/2024 | Akcayoz et al. | |

FOREIGN PATENT DOCUMENTS

| | | | |
|---|---|---|---|
| CN | 220059677 | U | 11/2023 |
| CN | 223075626 | U | 7/2025 |
| CN | 120684278 | A | 9/2025 |
| DE | 102018204521 | A1 | 9/2019 |
| EP | 0418887 | B1 | 3/1994 |
| EP | 3299592 | B1 | 3/2020 |
| GB | 1047552 | A | 11/1966 |
| JP | 2004084639 | A | 3/2004 |
| KR | 20210103853 | A | 8/2021 |
| KR | 102697340 | A | 8/2024 |

* cited by examiner

EXHAUST CASE FOR AIRCRAFT ENGINE

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided an exhaust system for an aircraft engine, comprising: a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit; and an exhaust case surrounding the TED, the exhaust case having: a frustoconical section extending from a fore end at an intersection with a remainder of the exhaust case to an aft end securable to a turbine case of the aircraft engine, the frustoconical section converging towards the central axis from the fore end to the aft end; and a connecting flange at the aft end, the connecting flange protruding inwardly towards the central axis.

The exhaust system described above may include any of the following features, in any combinations.

In some embodiments, the aft end of the frustoconical section further defines an annular face extending around the central axis and facing the central axis, the annular face configured to abut a flange of the turbine case.

In some embodiments, a diameter of the annular face is selected to define a tight fit engagement with the flange of the turbine case.

In some embodiments, the exhaust case includes a main section joined to the frustoconical section at the fore end of the frustoconical section.

In some embodiments, the main section has a frustoconical shape and increases in diameter towards the fore end of the frustoconical section.

In some embodiments, the main section defines openings for receiving the outlet conduits of the TED.

In some embodiments, a thickness of the frustoconical section is greater than a thickness of the main section.

In some embodiments, the thickness of the frustoconical section at its intersection with the main section is at least about 75% of a thickest point of the frustoconical section.

In some embodiments, the thickness of the frustoconical section is selected to provided containment capabilities to the frustoconical section.

In some embodiments, the frustoconical section extends along a direction from the fore end to the aft end, the direction having both of an axial component and a radial component relative to the central axis, the direction selected such that a projection of the frustoconical section along the direction intersects the turbine case.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings secured to a turbine case enclosing the turbine section; and a turbine exhaust duct (TED) having an annular inlet conduit extending around the central axis for directing combustion gases generally in an axial direction and outlet conduits communicating with the annular inlet conduit and extending generally radially outward relative to the annular inlet conduit, the outlet conduits communicating with the opening of the exhaust case, wherein the exhaust case has: a frustoconical section extending from a fore end at an intersection with a remainder of the exhaust case to an aft end securable to a turbine case, the frustoconical section converging towards the central axis from the fore end to the aft end; and a connecting flange at the aft end, the connecting flange protruding inwardly towards the central axis.

The reverse-flow gas turbine engine described above may include any of the following features, in any combinations.

In some embodiments, the aft end of the frustoconical section further defines an annular face extending around the central axis and facing the central axis, the annular face abutting a flange of the turbine case.

In some embodiments, a tight fit engagement is defined between the annular face and the flange of the turbine case.

In some embodiments, the exhaust case includes a main section joined to the frustoconical section at the fore end of the frustoconical section.

In some embodiments, the main section has a frustoconical shape and increases in diameter towards the fore end of the frustoconical section.

In some embodiments, the main section defines openings for receiving the outlet conduits of the TED.

In some embodiments, a thickness of the frustoconical section is greater than a thickness of the main section.

In some embodiments, the thickness of the frustoconical section is selected to provided containment capabilities to the frustoconical section.

In some embodiments, the thickness of the frustoconical section at its intersection with the main section is at least about 75% of a thickest point of the frustoconical section.

In some embodiments, the frustoconical section extends along a direction from the fore end to the aft end, the direction having both of an axial component and a radial component relative to the central axis, a projection of the frustoconical section along the direction intersecting the turbine case.

DESCRIPTION OF THE DRAWINGS

Reference is now made to the accompanying figures in which.

DETAILED DESCRIPTION

Figure 1:
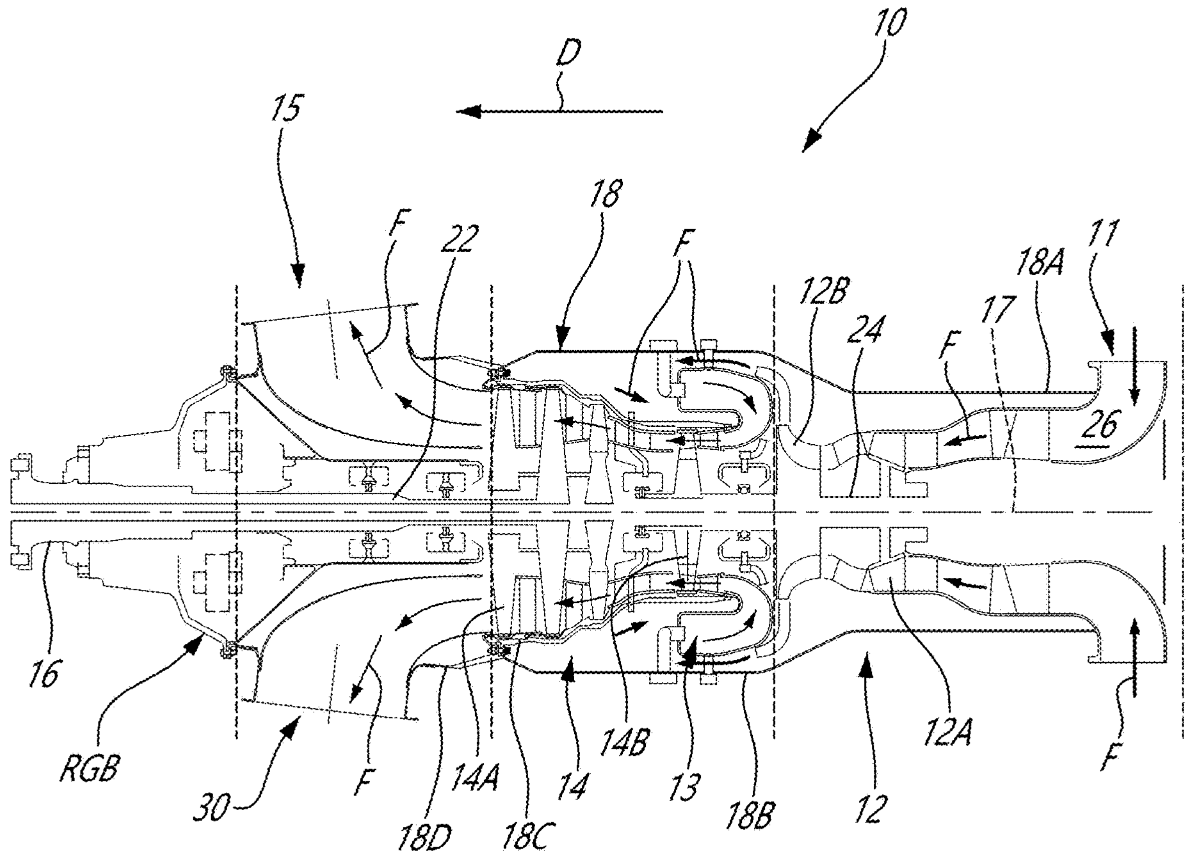
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a central core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a gearbox RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 40 being part of the exhaust system 15.

Figure 2:
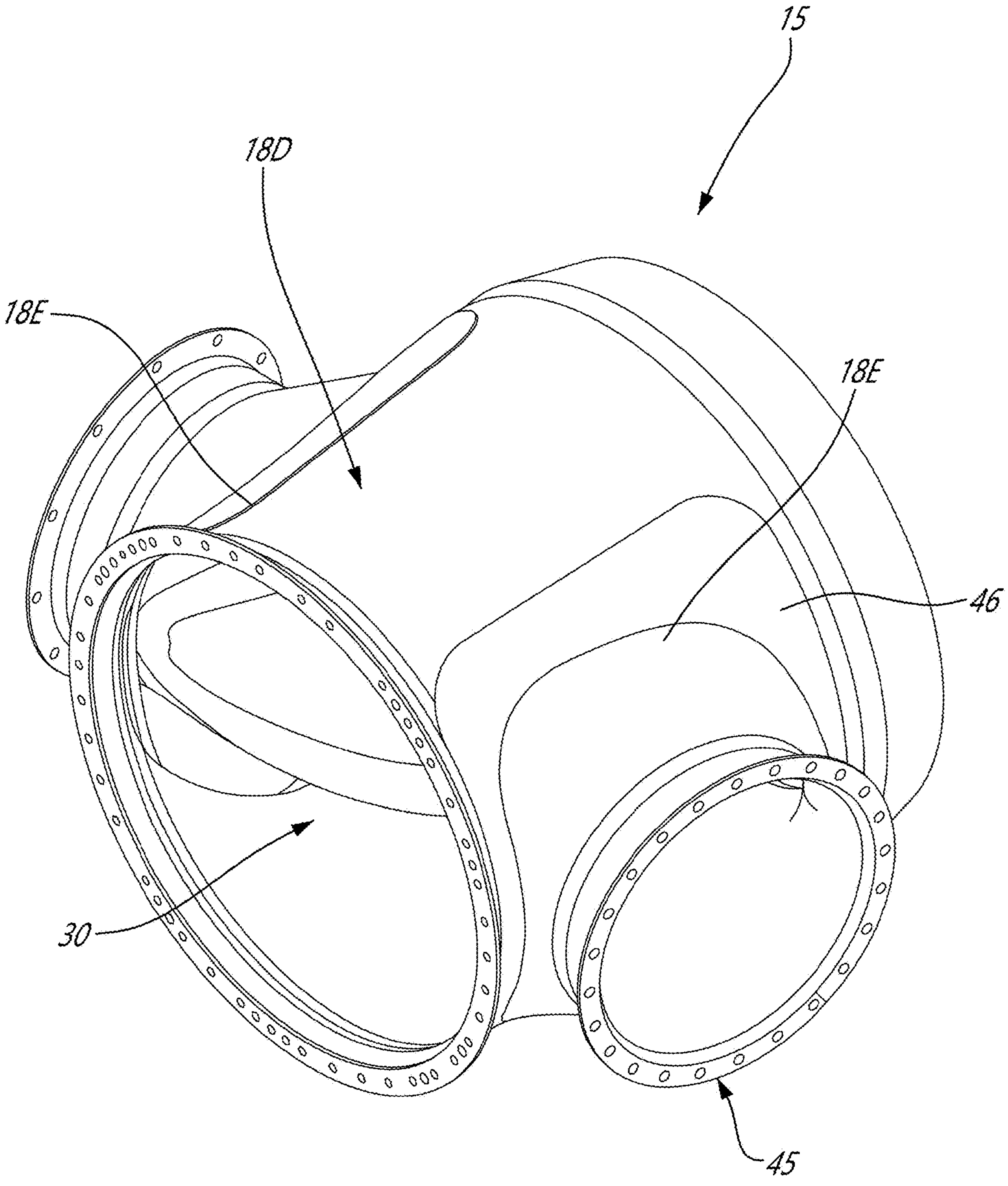
FIG. 2 is a three dimensional view of an exhaust system of the aircraft engine of FIG. 1.
Figure 3:
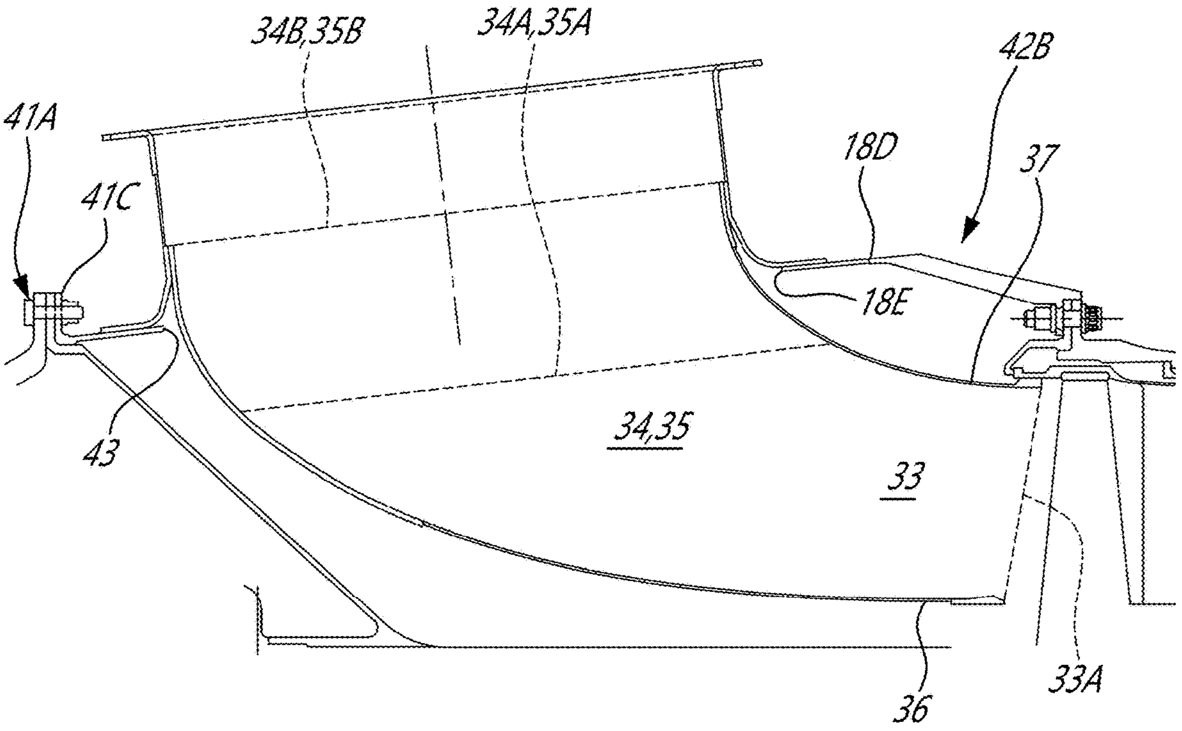
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 40. The exhaust case 40 extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
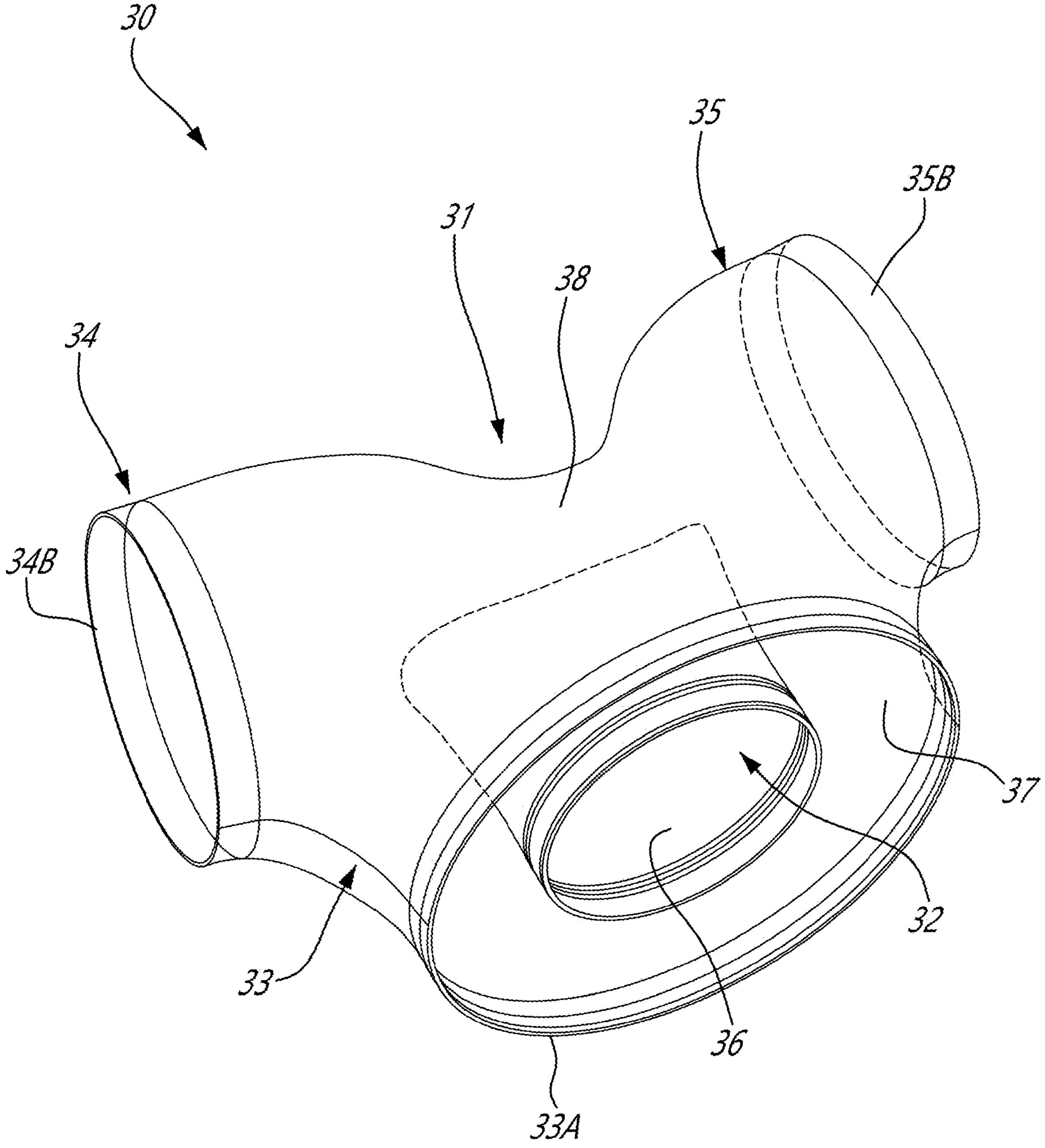
FIG. 4 is a three dimensional view of a turbine exhaust duct of the exhaust system of FIG. 3.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit portion 34, 35 projects outwardly of the exhaust case 40. As best shown in FIG. 3, each outlet conduit portion 34, 35 terminates into an exhaust port. The outlet conduits extend along respective axes that intersect the central axis 17. According to the illustrated embodiment, these axes has a main radial component and a secondary (i.e. smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Figure 5:
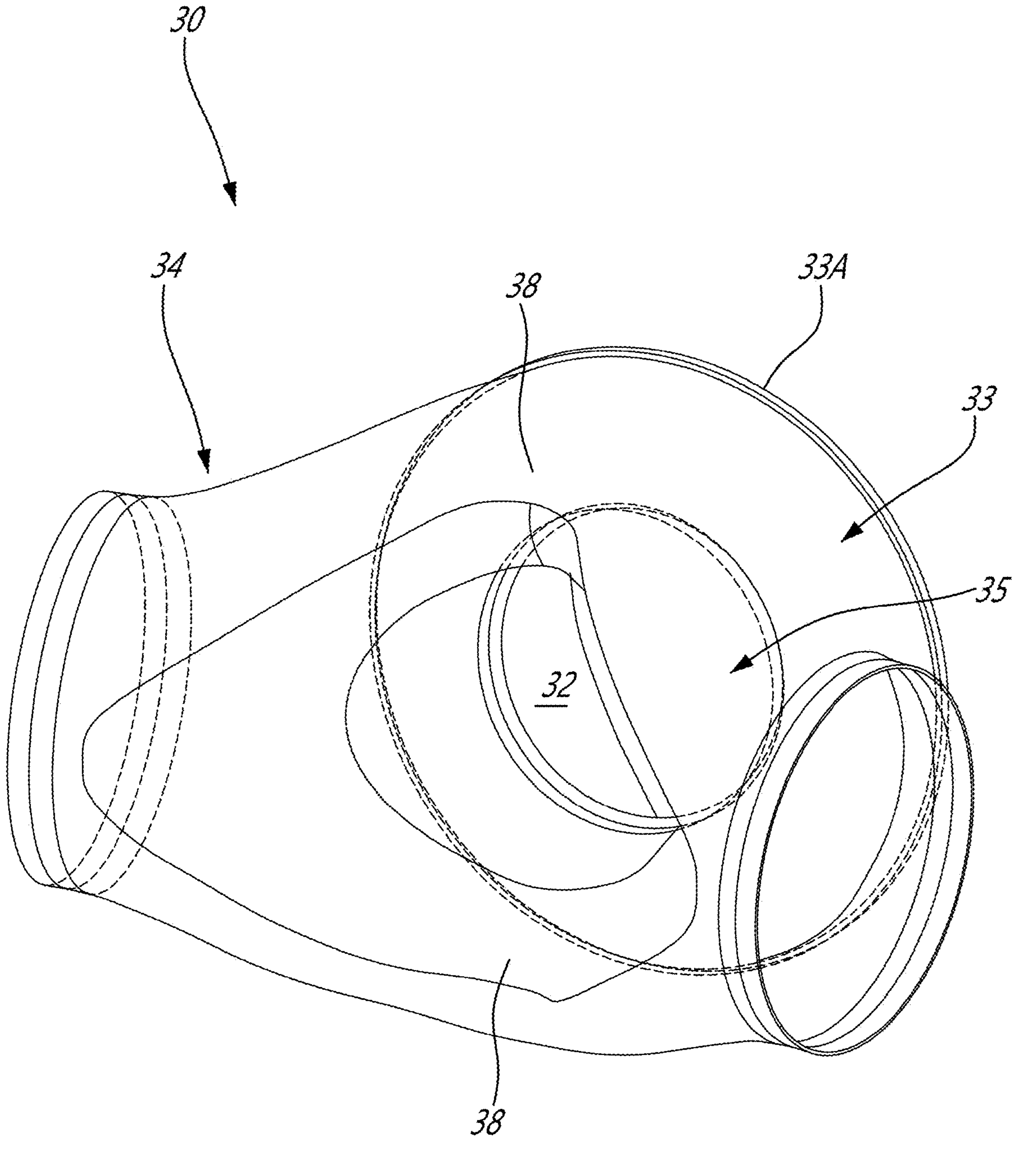
FIG. 5 is another three dimensional view of the turbine exhaust duct of FIG. 4.

Referring to FIGS. 3-5, the turbine exhaust duct 30, in this embodiment is a dual ports exhaust duct, and is formed by a generally Y-shaped body 31. The body 31 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIG. 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Still referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

It has been observed by the inventors of the present disclosure that, during engine operation, when a maneuvering load is communicated by the gearbox RGB (FIG. 1) to a structure of the exhaust system 15, the rigidity of the exhaust case 40 must be high enough to support the loads without affecting the engine's radial clearances. Care should be thus taken to mitigate a negative impact on engine performance such as affecting turbine tip clearance, radial seal clearances and disc bore clearance with a shaft of the gas turbine engine 10.

One challenge is to improve the structure to meet the stiffness requirement while retaining flexibility for thermal growth since the exhaust system 15 is met with hot combustion gases. According to some embodiments, the exhaust case 40 may be tunable to meet analytical expectations. As will be seen hereinafter, the exhaust case 40 may be designed to allow stiffness to be reduced or improved by modifying the flange thickness without affecting its linear profile.

Figure 6:
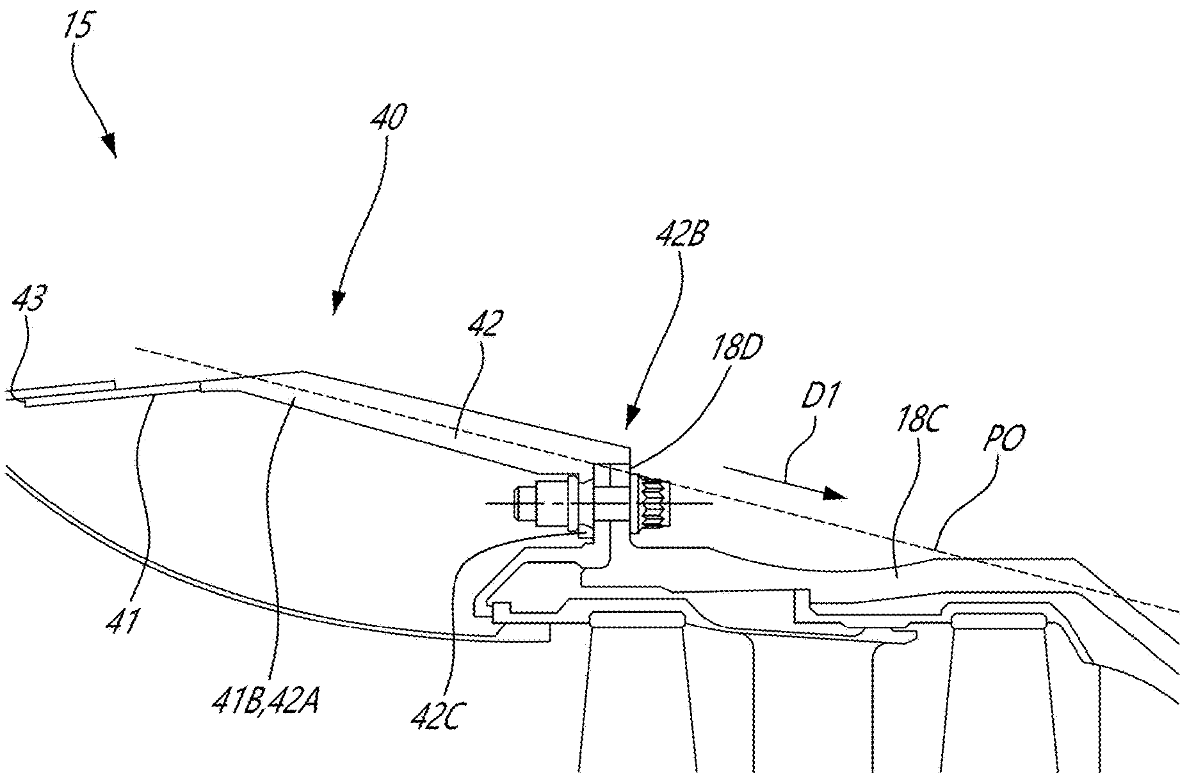
FIG. 6 is an enlarged view of FIG. 3 illustrating a portion of an exhaust case of the engine of FIG. 1.
Figure 7:
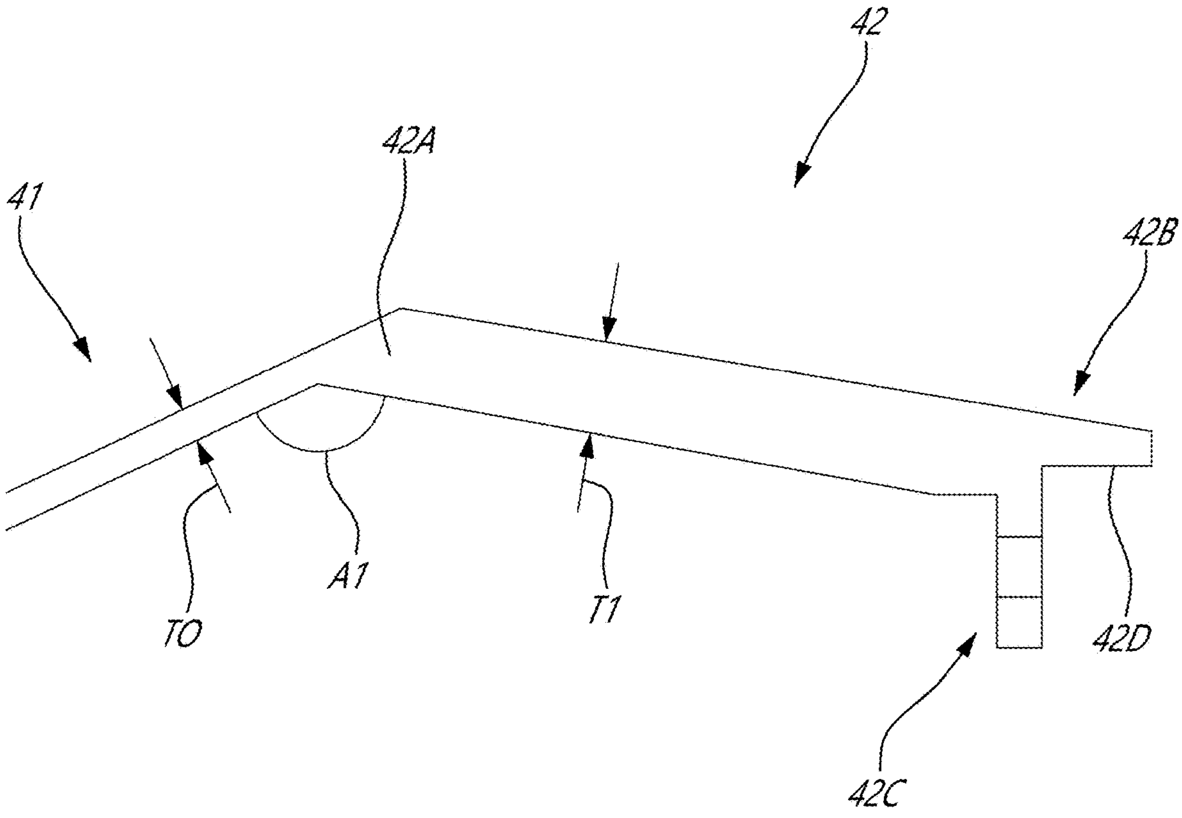
FIG. 7 is an enlarged view of a portion of FIG. 6 illustrating a frustoconical section of the exhaust case.

Referring now to FIGS. 3 and 6-7, the exhaust case 40 is shown connected to a flange 18D of the turbine case 18C. The exhaust case 40 has a main section 41 and a frustoconical section 42. The main section 41 extends from a forward end 41A to a rear end 41B and the frustoconical section 42 extends from a fore end 42A to an aft end 42B. The rear end 41B of the main section 41 is connected to the fore end 42A of the frustoconical section 42. An angle A1 is defined between the main section 41 and the frustoconical section 42. The angle is less than 180 degrees. The angle A1 is selected such that central axes of the outlet conduits 34, 35 are substantially perpendicular to the main section 41 of the exhaust case 40. The expression "substantially" implies slight variations caused by, for instance, manufacturing tolerances. In some cases, from 0 to 5 degrees from perfectly perpendicular is encompassed by the expression "substantially perpendicular". In the embodiment shown, the frustoconical section 42 extends towards the central axis 17 from the fore end 42A to the aft end 42B. In other words, the frustoconical section 42 converges towards the central axis 17. The main section 41 may also be frustoconical and may extends away from the central axis 17 from the forward end 41A to the rear end 41B. Put differently, a diameter of the main section 41 may increase towards the rear end 41B whereas a diameter of the frustoconical section 42 decreases towards the aft end 42B. The exhaust case 40 may thus have a convex shape when seen from outside a volume enclosed by the case assembly 18 and enclosing the core of the gas turbine engine 10.

In the embodiment shown, openings 43 are defined through the exhaust case 40 for receiving the outlet conduits 34, 35 of the turbine exhaust duct 30. The openings 43 may be defined through the main section 41. The frustoconical section 42 may be devoid of openings.

A forward flange 41C is defined at the forward end 41A of the main section and is configured to be mated with another flange of the case assembly 18. Similarly, a rearward flange 42C is located at the aft end 42B of the frustoconical section 42 and secured to the flange 18D of the turbine case 18C. In the embodiment shown, the rearward flange 42C protrudes radially inwardly towards the central axis 17 and away from the exhaust case 40.

As shown in FIG. 7, the rearward flange 42C is offset from an aft-most end of the exhaust case 40. This offset creates an annular face 42D and defines an annular notch sized to receive the flange 18D of the turbine case 18C. Thus, both of axial and radial loads may be transferred to the turbine case 18C via the abutment of both of the flange 42C and the annular face 42D against the flange 18D of the turbine case 18C. The annular face 42D extends around the central axis 17 and faces the central axis 17. The annular face 42D abuts the flange 18D of the turbine case 18C. In this embodiment, a tight fit is defined between the annular face 42D and the flange 18D of the turbine case 18C. The tight fit may be defined by a diameter of the annular face 42D being smaller than a diameter of an outer face of the flange 18D of the turbine case 18C prior to assembly.

In the disclosed embodiment, a thickness T1 of the frustoconical section 42 is greater than a thickness T0, which may be referred to as a baseline thickness, of the main section 41. The thickness T1 may be selected to provide containment capabilities to the frustoconical section 42. In such a case, the gas turbine engine 10 may be devoid of a containment ring located radially inward and axially overlapping the exhaust case 40. In some embodiments, the thickness T1 of the frustoconical section 42 at its fore end 42A is at least about 75% to 100% of a thickest point of the frustoconical section 42, which is located at the aft end 42B. A ratio of the thickness T1 of the frustoconical section 42 to the thickness T0 of the main section 41 is selected to ensure containment capabilities. In the context of the present disclosure, the expression "about" implies variations of plus or minus 10%. This ratio T1/T0 may be at least 2.

Referring to FIG. 6, another feature that may contribute to the stiffness of the exhaust case 40 is that the frustoconical section 42 extends along a direction D1 from the fore end 42A to the aft end 42B. The direction D1 has both of an axial component and a radial component relative to the central axis 17. As illustrated, the direction D1 is selected such that a projection PO of the frustoconical section 42 along the direction D1 intersects the turbine case 18C. This may create a load path allowing the loads received by the exhaust case 40 to be transferred to the turbine case 18C. This may thus increase an overall stiffness of the case assembly 18.

The above architecture shows a flange structure that may considerably improve the rigidity of a reverse-flow exhaust duct. Given the engine's small radial clearance in the nacelle, keeping the bolted joint in the lowest position to make room for the accessories around the engine may be a design constraint. Some embodiments of the exhaust case 40 may at least partially eliminate deflection through the exhaust. During engine operation, when a maneuvering load is communicated by the gearbox to the exhaust flange structure, the flange may then support the loads transferred thereto. This structure may improves rigidity and may considerably reduce deflection.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine, comprising:
- a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit; and
- an exhaust case surrounding the TED, the exhaust case having:
  - a frustoconical section extending from a fore end at an intersection with a remainder of the exhaust case to an aft end securable to a turbine case of the aircraft engine, the frustoconical section converging towards the central axis from the fore end to the aft end, the frustoconical section having an annular face oriented inwardly towards the central axis, the annular face extending from the fore end to the aft end; and a connecting flange protruding inwardly from the annular face of the frustoconical section towards the central axis, the connecting flange being axially offset from the aft end relative to the central axis and located axially between the fore end and the aft end of the frustoconical section, a portion of the annular face extending from the connecting flange to the aft end, the portion defining an abutment for a flange of the turbine case.

2. The exhaust system of claim 1, wherein the connecting flange defines an axial face configured to abut the flange of the turbine case.

3. The exhaust system of claim 1, wherein a diameter of the annular face is selected to define a tight fit engagement with the flange of the turbine case.

4. The exhaust system of claim 1, wherein the exhaust case includes a main section joined to the frustoconical section at the fore end of the frustoconical section.

5. The exhaust system of claim 4, wherein the main section has a frustoconical shape and increases in diameter towards the fore end of the frustoconical section.

6. The exhaust system of claim 4, wherein the main section defines openings for receiving the outlet conduits of the TED.

7. The exhaust system of claim 4, wherein a thickness of the frustoconical section is greater than a thickness of the main section.

8. The exhaust system of claim 7, wherein the thickness of the frustoconical section at its intersection with the main section is at least about 75% of a thickest point of the frustoconical section.

9. The exhaust system of claim 7, wherein the thickness of the frustoconical section is selected to provided containment capabilities to the frustoconical section.

10. The exhaust system of claim 1, wherein the frustoconical section extends along a direction from the fore end to the aft end, the direction having both of an axial component and a radial component relative to the central axis, the direction selected such that a projection of the frustoconical section along the direction intersects the turbine case.

11. A reverse-flow gas turbine engine, comprising:

an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings secured to a turbine case enclosing the turbine section, the turbine case having a flange protruding radially away from the central axis; and a turbine exhaust duct (TED) having an annular inlet conduit extending around the central axis for directing combustion gases generally in an axial direction and outlet conduits communicating with the annular inlet conduit and extending generally radially outward relative to the annular inlet conduit, the outlet conduits communicating with the openings of the exhaust case, wherein the exhaust case has:

a frustoconical section extending from a fore end at an intersection with a remainder of the exhaust case to an aft end securable to the turbine case, the frustoconical section converging towards the central axis from the fore end to the aft end; and a connecting flange protruding inwardly towards the central axis from the frustoconical section, wherein the flange of the turbine case abuts an annular face of the frustoconical section, the annular face oriented towards the central axis, the flange of the turbine case axially facing an axial face of the connecting flange.

12. The reverse-flow gas turbine engine of claim 11, wherein the connecting flange protrudes radially inwardly from the annular face of the frustoconical section and is axially offset from the aft end of the frustoconical section.

13. The reverse-flow gas turbine engine of claim 12, wherein a tight fit engagement is defined between the annular face and the flange of the turbine case.

14. The reverse-flow gas turbine engine of claim 11, wherein the exhaust case includes a main section joined to the frustoconical section at the fore end of the frustoconical section.

15. The reverse-flow gas turbine engine of claim 14, wherein the main section has a frustoconical shape and increases in diameter towards the fore end of the frustoconical section.

16. The reverse-flow gas turbine engine of claim 14, wherein the main section defines openings for receiving the outlet conduits of the TED.

17. The reverse-flow gas turbine engine of claim 14, wherein a thickness of the frustoconical section is greater than a thickness of the main section.

18. The reverse-flow gas turbine engine of claim 17, wherein the thickness of the frustoconical section is selected to provided containment capabilities to the frustoconical section.

19. The reverse-flow gas turbine engine of claim 17, wherein the thickness of the frustoconical section at its intersection with the main section is at least about 75% of a thickest point of the frustoconical section.

20. The reverse-flow gas turbine engine of claim 11, wherein the frustoconical section extends along a direction from the fore end to the aft end, the direction having both of an axial component and a radial component relative to the central axis, a projection of the frustoconical section along the direction intersecting the turbine case.

* * * * *